United States Patent
Yamada et al.

(10) Patent No.: US 6,214,278 B1
(45) Date of Patent: Apr. 10, 2001

(54) RUBBER-MODIFIED STYRENE COPOLYMER

(75) Inventors: Takeshi Yamada; Tetsuya Shinmura, both of Ichihara (JP)

(73) Assignee: Denki Kagaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/639,114

(22) Filed: Aug. 16, 2000

Related U.S. Application Data

(62) Division of application No. 09/251,487, filed on Feb. 17, 1999.

(51) Int. Cl.$^7$ .............................. H05B 6/00; B28B 1/00
(52) U.S. Cl. .................... 264/464; 264/638; 264/639; 264/650; 428/221; 428/364; 428/542.2
(58) Field of Search .................... 264/464, 638, 264/639, 650; 428/221, 364, 542.2

(56) References Cited

U.S. PATENT DOCUMENTS 5,115,028 * 5/1992 Gebizlioglu et al. ............... 525/232

FOREIGN PATENT DOCUMENTS

| 52-124095 | 10/1977 | (JP). |
| 6-16744 | 1/1994 | (JP). |
| 7-330996 | 12/1995 | (JP). |
| 8-239532 | 9/1996 | (JP). |

* cited by examiner

*Primary Examiner*—Nathan M. Nutter
(74) *Attorney, Agent, or Firm*—Oblon, Spivak, McClelland, Maier & Neustradt, P.C.

(57) ABSTRACT

A rubber-modified styrene type polymer excellent in transparency and excellent in impact strength and moldability, is presented. A rubber-modified styrene type polymer comprising from 1 to 15 parts by weight of a dispersed phase made of a rubber-like elastic material and from 99 to 85 parts by weight of a continuous phase made of a polymer comprising from 35 to 75 wt % of styrene type monomer units and from 65 to 25 wt % of (meth)acrylate type monomer units, wherein the rubber-like elastic material is a styrene (30 to 50 wt %)-butadiene (70 to 50 wt %) block copolymer, the weight average molecular weight (Mw) of the polystyrene portions of this block copolymer is from 45,000 to 75,000, and the ratio (Mw/Mn) of MW to the number-average molecular weight (Mn) is from 1.20 to 1.80.

2 Claims, No Drawings

RUBBER-MODIFIED STYRENE COPOLYMER

This application is a divion of Ser. No. 09/251,487, filed Feb. 17, 1999.

DETAILED DESCRIPTION OF THE INVENTION

1. Technical Field of the Invention

The present invention relates to a rubber-modified styrene type polymer excellent in transparency, impact strength and moldability.

2. Prior Art

A styrene type polymer is a synthetic resin excellent in transparency, moldability and rigidity and has been widely used as a molding material for e.g. household articles, electric appliances and packages. And, as the application fields have expanded, it has been demanded to improve the impact strength of the styrene type polymer. A styrene type polymer containing a rubber-like elastic material as dispersed particles in order to improve the impact strength of the styrene type polymer, i.e. a rubber-modified styrene type polymer, is known. However, such a rubber-modified styrene type polymer has been poor in transparency as compared with a styrene-type polymer not modified with rubber, and it has had a drawback that it can not be used in a field where the transparency is particularly required.

On the other hand, a technique is also known to improve the impact strength by blending a styrene-butadiene block copolymer to a polystyrene. However, such a styrene type polymer composition has a drawback that due to a heat history during the molding, the styrene-butadiene block copolymer undergoes crosslinking to form a so-called gelled substance, which deteriorates the appearance of the molded product. Further, such a styrene type polymer composition also has a drawback that the cost is high.

Also known is a technique to obtain a transparent rubber-modified styrene type polymer excellent in impact strength, which comprises styrene, methyl methacrylate and a styrene-butadiene block copolymer. However, such is not yet sufficient to satisfy the demand of the market which requires excellent transparency.

PROBLEMS TO BE SOLVED BY THE INVENTION

It is an object of the present invention to provide a rubber-modified styrene type polymer which is excellent in the transparency of a sheet or a film as an injection molded product or an extrusion molded product and which is excellent also in the impact strength and moldability.

MEANS TO SOLVE THE PROBLEMS

The present inventors have conducted a research strenuously to accomplish such an object and as a result, has found it possible to obtain a rubber-modified styrene type polymer having excellent transparency by employing, as a rubber-like elastic material for forming a dispersed phase of a rubber-modified styrene type polymer, a styrene-butadiene block copolymer wherein the weight average molecular weight (Mw) of the polystyrene portions is from 45,000 to 75,000, and the ratio (Mw/Mn) of the weight average molecular weight to the number average molecular weight (Mn) is from 1.20 to 1.80, whereupon the present invention has been accomplished. Namely, the present invention provides a rubber-modified styrene type polymer excellent in transparency, impact strength and moldability, comprising from 1 to 15 parts by weight of a dispersed phase made of a rubber-like elastic material and from 99 to 85 parts by weight of a continuous phase made of a polymer comprising from 35 to 75 wt % of styrene type monomer units and from 65 to 25 wt % of (meth)acrylate type monomer units, wherein the rubber-like elastic material is a styrene-butadiene block copolymer comprising from 30 to 50 wt % of styrene monomer units and from 70 to 50 wt % of butadiene monomer units, the weight average molecular weight (Mw) of the polystyrene portions of the styrene-butadiene block copolymer is from 45,000 to 75,000, and the ratio (Mw/Mn) of the weight average molecular weight to the number-average molecular weight (Mn) is from 1.20 to 1.80.

Now, the present invention will be described in detail.

The rubber-like elastic material to be used in the present invention is a styrene-butadiene block copolymer. And, in order to obtain the excellent transparency of the rubber-modified styrene type polymer, it is necessary that the weight ratio of the styrene monomer units to the butadiene monomer units of the styrene-butadiene block copolymer is 30-50:70-50. Further, it is also necessary that the styrene-butadiene block copolymer has the weight average molecular weight (Mw) of the polystyrene portions within a range of from 45,000 to 75,000. If Mw is less than 45,000 or exceeds 75,000, the transparency of the rubber-modified styrene type polymer tends to be poor. Further, the ratio (Mw/Mn) of Mw to the number average molecular weight (Mn) is from 1.20 to 1.80. If it departs from this range, it is also impossible to obtain the excellent transparency of the rubber-modified styrene type polymer.

The molecular weight of the polystyrene portions was determined by measuring GPC of the polystyrene obtained by subjecting the styrene-butadiene block copolymer to ozone decomposition by a method disclosed in a literature "RUBBER CHEMISTRY AND TECHNOLOGY", Vol.58, p.16 (Y. Tanaka, et. Al., 1985) and obtaining the molecular weight corresponding to each peak from a calibration curve prepared by using standard polystyrene.

The styrene-butadiene block copolymer to be used in the present invention can be obtained by polymerizing a styrene monomer and a butadiene monomer under specific conditions in an organic solvent by using an organic lithium compound as an initiator. As the organic solvent, a known organic solvent, for example, an aliphatic hydrocarbon such as butane, pentane, hexane, isopentane, heptane, octane or isooctane, an alicyclic hydrocarbon such as cyclopentane, methylcyclopentane, cyclohexane, methylcyclohexane or ethylcyclohexane, or an aromatic hydrocarbon such as benzene, toluene, ethylbenzene or xylene, may be employed. The organic lithium compound is a compound having at least one lithium atom bonded in the molecule, and ethyl lithium, n-propyl lithium, isopropyl lithium, n-butyl lithium, sec-butyl lithium or t-butyl lithium may, for example, be used. And, the weight average molecular weight (Mw) of the polystyrene portions of the styrene-butadiene block copolymer can be controlled by adjusting the ratio of the amount of the initiator to the amount of the styrene monomer and the butadiene monomer. Further, the ratio (Mw/Mn) of the weight average molecular weight (Mw) to the number average molecular weight (Mn) of the polystyrene portion of the styrene-butadiene block copolymer, can be controlled by adding a deactivator such as an organic acid such as acetic acid or stearic acid, an alcohol such as ethanol or butanol or water while adjusting the amount or the timing of the addition during the polymerization.

The rubber-like elastic material contained in the rubber-modified styrene type polymer of the present invention is from 1 to 15 parts by weight. If the rubber-like elastic material is less than 1 part by weight, the excellent impact strength can hardly be obtainable, and if it exceeds 15 parts by weight, the transparency and moldability tend to deteriorate, such being undesirable.

Now, the styrene type monomer and the (meth)acrylate type monomer as the polymer units for forming the continuous phase to be used in the present invention, will be described. The styrene type monomer to be used in the present invention may, for example, be styrene, α-methylstyrene, p-methylstyrene or p-t-butylstyrene. However, preferred is styrene. These styrene type monomers may be used alone or may be used in combination of two or more of them. On the other hand, the (meth)acrylate type monomer may, for example, be methyl methacrylate, ethyl methacrylate, methyl acrylate, ethyl acrylate, n-butyl acrylate, 2-methylhexyl acrylate, 2-ethylhexyl acrylate or octyl acrylate. However, preferred is methyl methacrylate or n-butyl acrylate. These (meth)acrylate type monomers may be used alone or may be used in combination of two or more of them.

The weight ratio of the styrene type monomer units to the (meth)acrylate type monomer units which form the continuous phase of the rubber-modified styrene type polymer of the present invention, is 35-75:65-25, preferably 42-59:58-41. If the weight ratio of the styrene type monomer units to the (meth)acrylate type monomer units is outside the range of 35-75:65-25, the transparency of the rubber-modified styrene type polymer deteriorates.

For the rubber modified styrene type polymer of the present invention, a bulk polymerization method, a solution polymerization method, a suspension polymerization method or an emulsion polymerization method, which is commonly used for the preparation of a styrene type polymer, may be employed. Further, either a batch system polymerization method or a continuous system polymerization method may be employed.

In such a polymerization method, as the polymerization initiator, an azo compound such as azobis butyronitrile or azobiscyclohexane carbonitrile, or an organic peroxide such as benzoyl peroxide, t-butyl peroxybenzoate, t-butyl peroxy-2-ethylhexanoate, di-t-butyl peroxide, dicumyl peroxide or ethyl-3,3-di-(t-butylperoxy)butyrate, may be employed. Further, as a molecular weight modifier, t-dodecylmercaptan, n-dodecylmercaptan or 4-methyl-2,4-diphenylpentene-1 may be added, and as a plasticizer, butylbenzyl phthalate may, for example, be added, as the case requires.

The rubber-modified styrene type polymer of the present invention may be processed into various molded products by a method such as injection molding, extrusion molding, compression molding or vacuum molding and practically used. Further, as the case requires, an additive such as an antioxidant, a weather resistant agent, a lubricant, a plasticizer, a colorant, an antistatic agent, a mineral oil or a flame retardant, may be incorporated at an optional stage such as prior to the initiation of the polymerization, during the polymerization reaction, during the post treatment of the polymer, or during the granulation, molding or processing of the polymer. The method for blending the additive is not particularly limited. However, various molded products of the styrene type polymer or its composition can be obtained, for example, by preliminarily mixing the rubber-modified styrene type polymer with the additive by a known blender such as Banbury mixer or a Henschel mixer, palletizing the mixture by an extruder and processing it by a method such as injection molding, extrusion molding or compression molding. Further, in order to improve the surface properties of a film or a sheet, an antistatic agent or a lubricant such as silicone may be coated on the surface.

EXAMPLES

Now, the present invention will be described in further detail with reference to Examples, but the present invention is not limited to these Examples.

In the following description, "parts" and "%" mean "parts by weight" and "wt %", respectively.

EXAMPLE 1

6.0 parts of a styrene-butadiene block copolymer A (content of styrene monomer units: 40%, Mw of polystyrene portions: 46,500, Mw/Mn=1.27) was dissolved in a monomer mixture comprising 58.5 parts of styrene, 36.0 parts of methyl methacrylate and 5.5 parts of n-butyl acrylate, and 0.04 part of benzoyl peroxide as a polymerization initiator and 0.2 part of t-dodecylmercaptan as a chain transfer agent, were added thereto. The mixture was heated at 90° C. for 8 hours with stirring and then cooled to stop bulk polymerization. Then, to the reaction mixture, 0.2 part of dicumyl peroxide was added afresh as a polymerization initiator. 0.001 part of sodium dodecylbenzene sulfonate and 0.5 part of calcium tertiary phosphate were added as suspension stabilizers to 200 parts of pure water, and the mixture was dispersed therein with stirring. And, this mixture was heated and polymerized at 100° C. for 2 hours, at 115° C. for 3.5 hours and at 130° C. for 2.5 hours.

After completion of the reaction, washing, removal of water and drying were carried out to obtain a rubber-modified styrene type polymer in the form beads. The composition of the obtained rubber-modified styrene type polymer is shown in Table 1, and its physical properties are shown in Table 2.

EXAMPLE 2

6.0 parts of a styrene-butadiene block copolymer B (content of styrene monomer units: 40%, Mw of polystyrene portions: 46,300, Mw/Mn=1.71) was dissolved in a monomer mixture comprising 58.5 parts of styrene, 36.0 parts of methyl methacrylate and 5.5 parts of n-butyl acrylate, and 0.04 part of benzoyl peroxide as a polymerization initiator and 0.2 part of t-dodecylmercaptan as a chain transfer agent were added thereto. The mixture was heated at 90° C. for 8 hours with stirring and then cooled to stop bulk polymerization.

Thereafter, the operation was carried out in the same manner as in Example 1 to obtain a rubber-modified styrene type polymer. The composition of the obtained rubber-modified styrene type polymer is shown in Table 1, and its physical properties are shown in Table 2.

EXAMPLE 3

A rubber-modified styrene type polymer was obtained in the same manner as in Example 1 except that as the styrene-butadiene copolymer, a styrene-butadiene block copolymer C (content of styrene monomer units: 40%, Mw of polystyrene portions: 73,500, Mw/Mn=1.26) was employed. The composition of the obtained rubber-modified styrene type polymer is shown in Table 1, and its physical properties are shown in Table 2.

EXAMPLE 4

A rubber-modified styrene type polymer was obtained in the same manner as in Example 1 except that as the styrene-butadiene copolymer, a styrene-butadiene block copolymer D (content of styrene monomer units: 40%, Mw of polystyrene portions: 73,300, Mw/Mn=1.72) was employed. The composition of the obtained rubber-modified styrene type polymer is shown in Table 1, and its physical properties are shown in Table 2.

EXAMPLE 5

A rubber-modified styrene type polymer was obtained in the same manner as in Example 1 except that as the styrene-butadiene copolymer, a styrene-butadiene block copolymer E (content of styrene monomer units: 40%, Mw of polystyrene portions: 62,500, Mw/Mn=1.52) was employed. The composition of the obtained rubber-modified styrene type polymer is shown in Table 1, and its physical properties are shown in Table 2.

EXAMPLE 6

6.0 parts of a styrene-butadiene block copolymer E (content of styrene monomer units: 40%, Mw of polystyrene portions: 62,500, Mw/Mn=1.52) was dissolved in a monomer mixture comprising 54.5 parts of styrene and 45.5 parts of methyl methacrylate, and 0.04 part of benzoyl peroxide as a polymerization initiator and 0.2 part of t-dodecylmercaptan as a chain transfer agent were added thereto. The mixture was heated at 90° C. for 8 hours with stirring and then cooled to stop bulk polymerization.

Thereafter, the operation was carried out in the same manner as in Example 1 to obtain a rubber-modified styrene type polymer. The composition of the obtained rubber-modified styrene type polymer is shown in Table 1, and its physical properties are shown in Table 2.

COMPARATIVE EXAMPLE 1

6.0 parts of a styrene-butadiene block copolymer F (content of styrene monomer units: 40%, Mw of polystyrene portions: 43,300, Mw/Mn=1.51) was dissolved in a monomer mixture comprising 58.5 parts of styrene, 36.0 parts of methyl methacrylate and 5.5 parts of n-butyl acrylate, and 0.04 part of benzoyl peroxide as a polymerization initiator and 0.2 part of t-dodecylmercaptan as a chain transfer agent were added thereto. The mixture was heated at 90° C. for 8 hours with stirring and then cooled to stop bulk polymerization. Thereafter, the operation was carried out in the same manner as in Example 1 to obtain a rubber-modified styrene type polymer. The composition of the obtained rubber-modified styrene type polymer is shown in Table 1, and its physical properties are shown in Table 2.

COMPARATIVE EXAMPLE 2

A rubber-modified styrene type polymer was obtained in the same manner as in Example 1 except that as the styrene-butadiene copolymer, a styrene-butadiene block copolymer G (content of styrene monomer units: 40%, Mw of polystyrene portions: 77,700, Mw/Mn=1.51) was employed. The composition of the obtained rubber-modified styrene type polymer is shown in Table 1, and its physical properties are shown in Table 2.

COMPARATIVE EXAMPLE 3

A rubber-modified styrene type polymer was obtained in the same manner as in Example 1 except that as the styrene-butadiene copolymer, a styrene-butadiene block copolymer H (content of styrene monomer units: 40%, Mw of polystyrene portions: 63,200, Mw/Mn=1.16) was employed. The composition of the obtained rubber-modified styrene type polymer is shown in Table 1, and its physical properties are shown in Table 2.

COMPARATIVE EXAMPLE 4

A rubber-modified styrene type polymer was obtained in the same manner as in Example 1 except that as the styrene-butadiene copolymer, a styrene-butadiene block copolymer I (content of styrene monomer units: 40%, Mw of polystyrene portions: 63,000, Mw/Mn=1.86) was employed. The composition of the obtained rubber-modified styrene type polymer is shown in Table 1, and its physical properties are shown in Table 2.

COMPARATIVE EXAMPLE 5

A rubber-modified styrene type polymer was obtained in the same manner as in Example 1 except that as the styrene-butadiene copolymer, a styrene-butadiene block copolymer J (content of styrene monomer units: 40%, Mw of polystyrene portions: 40,900, Mw/Mn=1.86) was employed. The composition of the obtained rubber-modified styrene type polymer is shown in Table 1, and its physical properties are shown in Table 2.

COMPARATIVE EXAMPLE 6

6.0 parts of a styrene-butadiene block copolymer J (content of styrene monomer units: 40%, Mw of polystyrene portions: 40,900, Mw/Mn=1.86) was dissolved in a monomer mixture comprising 54.5 parts of styrene and 45.5 parts of methyl methacrylate, and 0.04 part of benzoyl peroxide as a polymerization initiator and 0.2 part of t-dodecylmercaptan as a chain transfer agent were added thereto. The mixture was heated at 90° C. for 8 hours with stirring and then cooled to stop bulk polymerization. Thereafter, the operation was carried out in the same manner as in Example 1 to obtain a rubber-modified styrene type polymer. The composition of the obtained rubber-modified styrene type polymer is shown in Table 1, and its physical properties are shown in Table 2.

COMPARATIVE EXAMPLE 7

0.7 part of a styrene-butadiene block copolymer E (content of styrene monomer units: 40%, Mw of polystyrene portions: 62,500, Mw/Mn=1.52) was dissolved in a monomer mixture comprising 58.5 parts of styrene, 36.0 parts of methyl methacrylate and 5.5 parts of n-butyl acrylate, and 0.04 part of benzoyl peroxide as a polymerization initiator and 0.2 part of t-dodecylmercaptan as a chain transfer agent were added thereto. The mixture was heated at 90° C. for 8 hours with stirring and then cooled to stop bulk polymerization. Thereafter, the operation was carried out in the same manner as in Example 1 to obtain a rubber-modified styrene type polymer. The composition of the obtained rubber-modified styrene type polymer is shown in Table 1, and its physical properties are shown in Table 2.

COMPARATIVE EXAMPLE 8

17.0 parts of a styrene-butadiene block copolymer E (content of styrene monomer units: 40%, Mw of polystyrene portions: 62,500, Mw/Mn=1.52) was dissolved in a monomer mixture comprising 58.5 parts of styrene, 36.0 parts of methyl methacrylate and 5.5 parts of n-butyl acrylate, and 0.04 part of benzoyl peroxide as a polymerization initiator and 0.2 part of t-dodecylmercaptan as a chain transfer agent were added thereto. The mixture was heated at 90° C. for 8 hours with stirring and then cooled to stop bulk polymerization. Thereafter, the operation was carried out in the same manner as in Example 1 to obtain a rubber-modified styrene type polymer. The composition of the obtained rubber-modified styrene type polymer is shown in Table 1, and its physical properties are shown in Table 2.

The respective physical property values were obtained by using as a test sample a molded product obtained by extruding the rubber-modified styrene type polymer obtained in each Example (or Comparative Example) by a single screw extruder (PMS40-28, manufactured by IKG Company) at a cylinder temperature of 220° C. to obtain pellets, followed by injection molding of these pellets by a 2 ounce in-line screw injection molding machine (manufactured by Niigata Tekkosho) at a cylinder temperature of 220° C. However, for MFR, the above pellets were employed.

The methods for measuring the respective composition values and the respective physical property values are as follows.

(1) Izod impact strength: In accordance with ASTM D256, a notch with a depth of 2.54 mm was imparted to a test piece of 12.7×64×6.4 mm in thickness, and the measurement was carried out at an impact rate of 3.46 m/sec.

(2) Elongation: In accordance with ASTM D638, the measurement was carried out by using type 1 dumbbell with a chuck distance of 114 mm and a tensile rate of 5 mm/min.

(3) MFR: In accordance with JIS K7210, the measurement was carried out at a temperature of 200° C. under a load of 5 Kgf.

(4) Haze: In accordance with ASTM D1003, the measurement was carried out by using a test piece of 30×90×2 mm in thickness.

(5) Total light transmittance: In accordance with ASTM D1003, the measurement was carried out by using a test piece of 30×90×2 mm in thickness.

(6) Content of the rubber-like elastic material in the rubber-modified styrene type polymer: Obtained by measuring the absorbance at 960 $cm^{-1}$ and 910 $cm^{-1}$ by an infrared absorption spectrum method which is commonly used for a rubber-modified polystyrene.

(7) Proportion of the constituting units of the continuous phase of the rubber-modified styrene type polymer: The rubber-modified styrene type polymer was dissolved in toluene, followed by centrifugal separation, and the supernatant was taken, and methanol was added thereto, and the resin content thereby insolubilized was precipitated, collected by filtration and dried and used as a test sample, and by means of FT-NMR, the weight ratio of the styrene type monomer units and the (meth) acrylate type monomer units were measured.

TABLE 1

| | Proportion of constituting units (wt %) | | | Content of rubber-like elastic material |
|---|---|---|---|---|
| | Styrene type monomer | (meth) acrylate type monomer | | |
| | Styrene | MMA | n-BA | (wt %) |
| Example 1 | 58.2 | 36.2 | 5.8 | 5.7 |
| Example 2 | 58.4 | 35.9 | 5.7 | 5.8 |
| Example 3 | 58.3 | 36.0 | 5.7 | 5.8 |
| Example 4 | 58.6 | 35.8 | 5.6 | 5.7 |
| Example 5 | 58.7 | 35.9 | 5.4 | 5.9 |
| Example 6 | 54.4 | 45.6 | — | 5.8 |
| Comparative Example 1 | 58.6 | 36.0 | 5.4 | 5.8 |
| Comparative Example 2 | 58.5 | 36.2 | 5.3 | 5.8 |
| Comparative Example 3 | 58.6 | 35.8 | 5.6 | 5.7 |
| Comparative Example 4 | 58.6 | 36.0 | 5.4 | 5.9 |
| Comparative Example 5 | 58.6 | 36.2 | 5.2 | 5.7 |
| Comparative Example 6 | 54.3 | 45.7 | — | 5.9 |
| Comparative Example 7 | 58.3 | 36.2 | 5.5 | 0.6 |
| Comparative Example 8 | 58.4 | 36.1 | 5.5 | 16.1 |

MMA : Methyl methacrylate
n - BA : n-Butyl acrylate

| | Physical properties | | | | |
|---|---|---|---|---|---|
| | Izod impact strength (Kg·c,/cm) | Elongation (%) | MFR (g/10 min) | Haze (%) | Total light transmittance (%) |
| Example 1 | 9.0 | 60 | 6.8 | 1.9 | 90 |
| Example 2 | 9.1 | 60 | 6.9 | 1.8 | 90 |
| Example 3 | 9.0 | 60 | 6.7 | 1.9 | 90 |
| Example 4 | 9.0 | 60 | 6.8 | 1.8 | 90 |
| Example 5 | 9.0 | 60 | 6.9 | 1.7 | 90 |
| Example 6 | 9.0 | 60 | 3.8 | 1.9 | 90 |
| Comparative Example 1 | 9.1 | 60 | 6.8 | 5.8 | 88 |
| Comparative Example 2 | 9.0 | 60 | 6.7 | 5.5 | 88 |
| Comparative Example 3 | 9.0 | 60 | 6.8 | 5.7 | 88 |
| Comparative Example 4 | 9.1 | 60 | 6.8 | 5.6 | 88 |
| Comparative Example 5 | 9.0 | 60 | 6.8 | 5.9 | 88 |
| Comparative Example 6 | 9.0 | 60 | 3.7 | 5.7 | 88 |
| Comparative Example 7 | 2.3 | 15 | 9.7 | 2.0 | 90 |
| Comparative Example 8 | 14.6 | 75 | 2.1 | 17.7 | 85 |

EFFECTS OF THE INVENTION

According to the present invention, it is possible to provide a rubber-modified styrene type polymer excellent in transparency, impact strength and moldability.

What is claimed is:

1. A film or sheet of a rubber-modified styrene type polymer, said rubber-modified styrene type polymer comprising from 1 to 15 parts by weight of a dispersed phase made of an elastic material and from 99 to 85 parts by weight of a continuous phase made of a polymer comprising from 35 to 75 wt % of styrene type monomer units and from 65 to 25 wt % of (meth)acrylate type monomer units, wherein the elastic material is a styrene-butadiene block copolymer comprising from 30 to 50 wt % of styrene monomer units and from 70 to 50 wt % of butadiene monomer units, the weight average molecular weight (Mw) of the polystyrene portions of the styrene-butadiene block copolymer is from 45,000 to 75,000, and the ratio (Mw/Mn) of the weight average molecular weight to the number-average molecular weight (Mn) is from 1.20 to 1.80.

2. A molded product obtained by injecting or extruding a rubber-modified styrene type polymer, said rubber-modified styrene type polymer comprising from 1 to 15 parts by weight of a dispersed phase made of an elastic material and from 99 to 85 parts by weight of a continuous phase made of a polymer comprising from 35 to 75 wt % of styrene type monomer units and from 65 to 25 wt % of (meth)acrylate type monomer units, wherein the elastic material is a styrene-butadiene block copolymer comprising from 30 to 50 wt % of styrene monomer units and from 70 to 50 wt % of butadiene monomer units, the weight average molecular weight (Mw) of the polystyrene portions of the styrene-butadiene block copolymer is from 45,000 to 75,000, and the ratio (Mw/Mn) of the weight average molecular weight to the number-average molecular weight (Mn) is from 1.20 to 1.80.

* * * * *